April 10, 1934.  R. J. NORTON  1,954,534
BRAKE
Filed Jan. 9, 1931
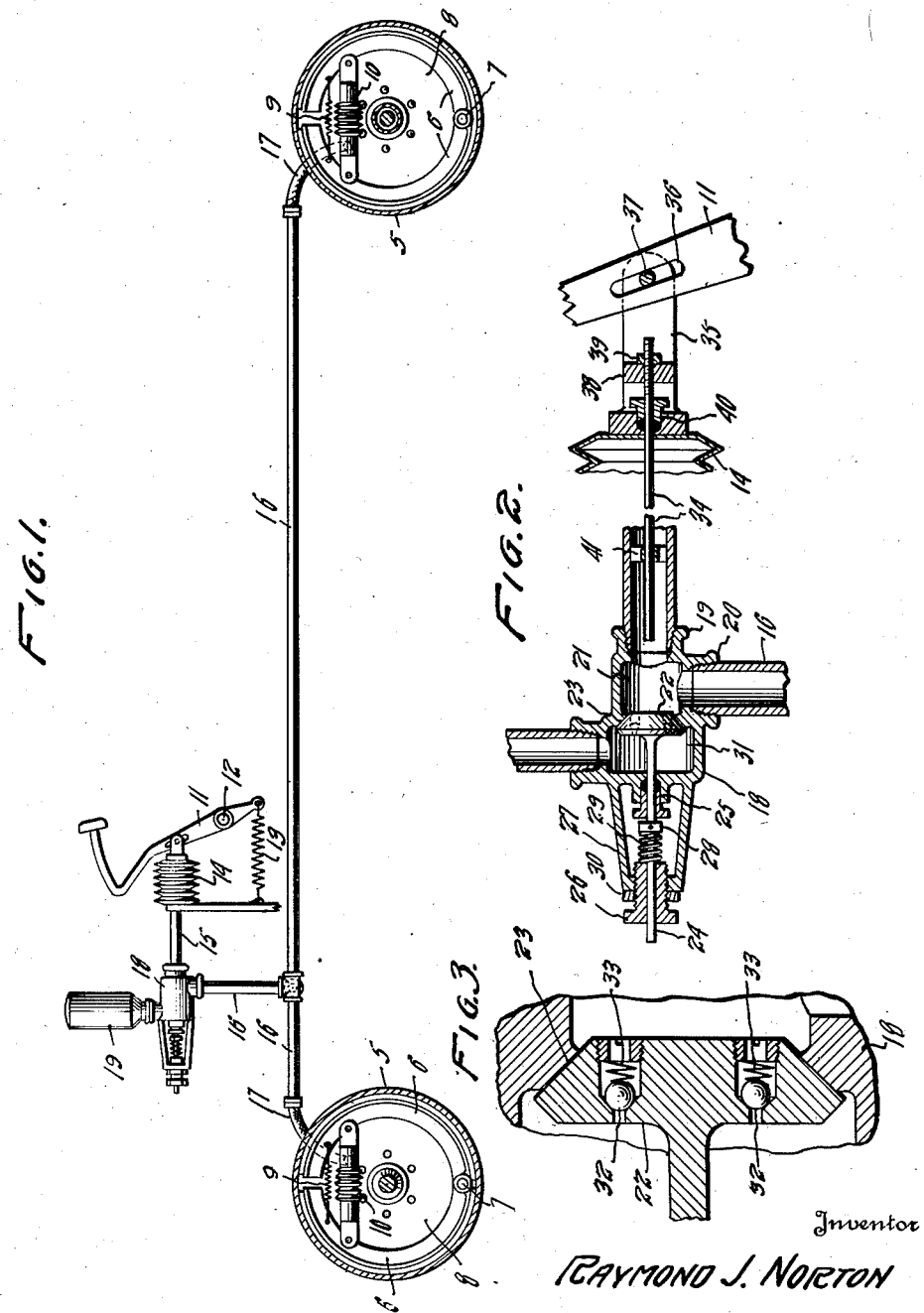
Inventor
RAYMOND J. NORTON
By Semmes and Semmes
Attorneys Patented Apr. 10, 1934

1,954,534

UNITED STATES PATENT OFFICE 1,954,534

BRAKE

Raymond J. Norton, Washington, D. C., assignor to Bendix Brake Company, South Bend, Ind., a corporation of Illinois Application January 9, 1931, Serial No. 507,687

4 Claims. (Cl. 188—152)

This invention relates in general to automotive vehicle brakes and more particularly has reference to the mechanism for actuating the means for engaging the brake drum to retard rotation thereof.

Brake mechanism of various constructions have been perfected. One type of brake having many desirable features and advantages over other types is that employing an internal expanding braking element. Under certain conditions it has been found that brake construction of this type and also brake construction of other types has a tendency to grab or chatter when applied. That is, the lining carried by the braking element grabs the drum to lock the drum against rotation or successively grabs and releases the drum causing a chatter. These effects are disagreeable to the driver and reduce the efficiency of the braking system.

A major object of this invention is to devise a brake construction which will eliminate the disadvantageous chattering and grabbing effects produced by the application of present braking mechanisms.

Another object of this invention is to provide a brake element actuating device which will permit the brake element to automatically release its grip on the drum just before grabbing action occurs.

Yet another object of this invention is to provide a fluid system for actuating an expansible brake element, so designed that it will not transmit a pressure sufficient to lock the brakes.

Still another object of this invention is to provide means in a fluid system for actuating vehicle brakes wherein the pressure can not be built up beyond a predetermined amount, said amount being just under that which would cause the brakes to grab or chatter.

With these and other objects in view which may be incident to my improvements, the invention consists in the parts and combinations to be hereinafter set forth and claimed with the understanding that the several necessary elements comprising my invention may be varied in construction, proportions and arrangement, without departing from the spirit and scope of the appended claims.

The present invention deals with the elimination of grabbing and chattering by the use of a novel valve arrangement in a fluid pressure brake actuating system. This valve is normally held seated, to retain the fluid in the system, by a yieldable means, which is adjustable to allow the valve to open and release the fluid in the system at a pressure just under that which would cause the brakes to grab or chatter. A further means for unseating the valve is provided in a member moving with the brake pedal or lever, which member engages and unseats the valve after the brake pedal or lever has moved a predetermined amount, which amount is similarly just under that which would cause locking. Means are also provided to allow the return of the escaped fluid to the system.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawing:

Figure 1 is a vertical side view, more or less diagrammatic, of the working parts of the mechanism, parts being shown in section;

Figure 2 is an enlarged sectional view showing the construction of the pressure release device; and Figure 3 is a further enlarged sectional view of the head of the valve used in the pressure release device.

Referring to the drawing, in which similar reference characters designate similar parts throughout the several views of the drawing, the numeral 5 designates the brake drums associated and rotating with the wheels of a motor vehicle. Mounted within the brake drums 5 are pairs of brake shoes, 6, pivotally anchored at 7 to the backing plates 8. Coil springs 9 connected to the free ends of the shoes 6, normally hold said shoes in their "off" or non-braking position. Also positioned near the free ends of the brake shoes are the expansible members 10, by which the brake shoes may be moved into engagement with the brake drums, against the action of the contracting springs 9.

The brake pedal 11, pivoted at 12, is normally held in release position by the spring 13, and is suitably connected to the compressible member 14. The compressible member 14 is connected to the expansible member 10 by means of the tubing 15, 16, preferably arranged along the frame members of the vehicle, and the flexible conduits 17. The parts 10, 14, 15, 16 and 17 form a closed system within which a suitable fluid is provided. It will be appreciated that when the pedal 11 is depressed, the member 14 will be compressed, raising the fluid pressure in the system, whereby the expansible members 10 will be expanded, and the shoes 6 forced into engagement with the drums 5. On release of the pedal pressure, the springs 9 and 13 will restore the parts to their non-braking position.

The braking system just described is chosen for purposes of illustration only, and my invention is not limited to use with the specific embodiment shown, but is capable of use with other types of fluid pressure braking systems. In such types of braking systems, difficulties have been experienced by the grabbing, chattering, or locking of the brakes, particularly where servo-brakes are used. To remedy this, I provide means whereby, regardless of the pressure on the pedal, only a certain amount of pressure may be transmitted to the means operating the brake shoes, which pressure is safely under that which would cause the brakes to grab or chatter.

Such pressure controlling means comprises a casing member 18 and is positioned at a suitable part of the system, such as between tubes 15 and 16, which are secured to said casing at the openings 19 and 20, respectively. These openings communicate with a chamber 21 within the casing. At one side of the chamber 21 there is positioned a valve consisting of the valve head 22, seating upon the valve seat 23. The valve head 22 is mounted upon the valve stem 24, which is slidably supported by the packing box 25 and the adjusting member 26, which has threaded engagement with the yoke 27. Secured to the valve stem 24 is a collar 28, and between this collar and the adjacent end of the adjusting member 26 there is mounted a relatively strong coil spring 29.

By this arrangement, it will be appreciated that when the pressure in chamber 21 reaches an amount sufficient to overcome the force of the spring 29, the valve head 22 will be unseated whereby the fluid in the system may escape. The adjusting member 26 is adjusted to place the spring 29 under such initial pressure that fluid will be released just under the pressure sufficient to cause the brakes to grab or chatter. A lock nut 30 holds the adjusting member in its adjusted position.

The fluid which escapes when too great a force is applied to the brake pedal passes into chamber 31 of the casing 18, and thence to the tank 19.

Return of the fluid to the braking system is accomplished by means of the ball valves 32, located in the valve head 22 and provided with relatively weak springs 33. When pressure on the pedal 11 is released, the spring 13 expands the compressible member 24 to its original size, reducing pressure in the braking system. Thus reduction of pressure not only permits the brake shoes to move their released position, but also allows any fluid which may have escaped to return to the system through valves 32.

Another means is provided for unseating the valve 22, comprising the rod 34. The compressible member 14 is provided with ears 35, which receive the pedal 11 between their ends. The pedal is provided with a slot 36 in which the pin 37, mounted on the ears, is received. A crossbar 38 also extends between the ears, and the rod 34 is adjustably mounted therein, and a lock nut 39 holds the rod in its adjusted position.

The rod 34 is slidably supported by the packing box 40, and one or more spiders 41 mounted in tube 15. Thus, when the compressible member is compressed a certain amount, corresponding to a certain pressure in the system, the rod 34 will engage and unseat the valve 22. Figure 2 shows the parts with the brakes fully released. Movement of the foot pedal 11 is effective to fully apply the brakes just before the rod 34 contacts with the valve member 22. When the rod 34 contacts with the valve member 22 and releases the brakes, another stroke of the pedal is necessary for their reapplication. The rod is adjusted lengthwise to unseat the valve at a pressure safely under that which would cause the brakes to grab or chatter.

It will thus be seen that I have provided a fluid pressure braking system wherein the undesirable features of grabbing and chattering of the brakes are avoided. Any suitable fluid may be used, either liquid or gaseous or a combination of the two, although the use of oil is preferred.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a fluid pressure braking system, a member for creating pressure, a valve for allowing fluid to escape from the system after a predetermined pressure has been reached, mechanical means operated by the brake pedal to unseat the valve to reduce the applied pressure at the brake and means in the valve body for allowing the escaped fluid to return to the system on the return of the members to their original position.

2. In a fluid pressure braking system, a member movable in one direction to apply the brakes and in the opposite direction to release the brakes for creating pressure, a valve for allowing fluid to escape from the system, and mechanical means for unseating said valve after the member has moved a predetermined distance in the direction to apply the brakes.

3. In a fluid pressure braking system, a movable member for creating pressure to apply braking means, a valve for allowing fluid to escape from the system, and an adjustable trip mechanism for unseating said valve to release the braking means after the member has moved a predetermined distance in the direction to apply the brakes.

4. In a fluid pressure braking system, a movable member for creating pressure to apply braking means, a valve adapted to be automatically unseated at a predetermined hydraulic pressure in the system for allowing fluid to escape from the system, adjustable mechanical means for unseating said valve to release the braking means after the member has moved a predetermined distance, and means for allowing the escaped fluid to return to the system on the return of the member to its original position.

RAYMOND J. NORTON.